United States Patent
Cao

(10) Patent No.: US 10,447,827 B2
(45) Date of Patent: Oct. 15, 2019

(54) METHODS AND DEVICES FOR IMPLEMENTING FLEXIBLE ETHERNET WITHIN A PHYSICAL CODING SUBLAYER

(71) Applicant: Huawei Technologies Co., Ltd., Shenzhen, Guangdong (CN)

(72) Inventor: Shiyi Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 15/183,569

(22) Filed: Jun. 15, 2016

(65) Prior Publication Data

US 2016/0294990 A1    Oct. 6, 2016

Related U.S. Application Data

(63) Continuation of application No. PCT/CN2013/089549, filed on Dec. 16, 2013.

(51) Int. Cl.
*H04L 29/08* (2006.01)
*H04L 1/00* (2006.01)

(52) U.S. Cl.
CPC .......... *H04L 69/323* (2013.01); *H04L 1/0083* (2013.01)

(58) Field of Classification Search
None
See application file for complete search history.

(56) References Cited

U.S. PATENT DOCUMENTS

| | | | |
|---|---|---|---|
| 7,787,502 B1 * | 8/2010 | Olsson | H04J 3/1682 370/535 |
| 9,521,092 B2 * | 12/2016 | Kono | H04L 49/208 |
| 2003/0235214 A1 * | 12/2003 | Leroux | H04L 12/413 370/504 |
| 2004/0184474 A1 * | 9/2004 | Kim | H04Q 11/0067 370/445 |
| 2007/0230480 A1 * | 10/2007 | Ikeda | H04L 47/10 370/395.52 |

(Continued)

FOREIGN PATENT DOCUMENTS

| | | |
|---|---|---|
| CN | 1533094 A | 9/2004 |
| CN | 101048009 A | 10/2007 |

(Continued)

OTHER PUBLICATIONS

"100GE and 40GE PCS Overview", IEEE 802.3az, Nov. 12, 2008, 27 pages.

(Continued)

*Primary Examiner* — Jason E Mattis
*Assistant Examiner* — Hong Shao
(74) *Attorney, Agent, or Firm* — Kilpatrick Townsend & Stockton, LLP

(57) ABSTRACT

Embodiments of the present invention relate to the communications field and disclose a data transmission method, apparatus, device, and system, so as to acquire attribution information of a PCSL, and decrease overheads and complexity of identifying a network link during data transmission. The method includes: inserting a feature code block into a physical coding sublayer PCS to form a physical coding sublayer lane PCSL, where the feature code block is used to represent an Ethernet link to which the PCSL belongs; and sending the PCSL. The present invention is used for PCSL attribution identification.

12 Claims, 15 Drawing Sheets

---

Insert a feature code block into a physical coding sublayer PCS to form a physical coding sublayer lane PCSL — 101

A transmit end sends the PCSL — 102

(56) References Cited

U.S. PATENT DOCUMENTS

| | | | |
|---|---|---|---|
| 2010/0092174 A1 | 4/2010 | Brown et al. | |
| 2010/0158518 A1 | 6/2010 | Shin et al. | |
| 2010/0246389 A1* | 9/2010 | Toyoda | H04L 41/0677 370/226 |
| 2010/0254704 A1* | 10/2010 | Aoki | H04B 10/40 398/45 |
| 2010/0329112 A1* | 12/2010 | Ahn | H04L 25/14 370/225 |
| 2011/0149772 A1* | 6/2011 | Han | H04L 49/351 370/252 |
| 2012/0044951 A1 | 2/2012 | Han | |
| 2012/0155486 A1* | 6/2012 | Ahn | H04L 5/1423 370/433 |
| 2012/0251106 A1 | 10/2012 | Valiveti et al. | |
| 2012/0327769 A1* | 12/2012 | Ghiasi | H04L 49/60 370/235 |
| 2013/0077623 A1* | 3/2013 | Han | H04L 47/25 370/389 |
| 2013/0083810 A1* | 4/2013 | Ghiasi | H04J 3/047 370/535 |
| 2013/0262941 A1* | 10/2013 | Wang | H04L 25/14 714/712 |
| 2014/0177652 A1* | 6/2014 | Su | H04L 47/16 370/476 |
| 2014/0241369 A1* | 8/2014 | Ghiasi | H04L 49/9057 370/394 |
| 2014/0286346 A1* | 9/2014 | Ghiasi | H04L 45/60 370/401 |
| 2014/0362989 A1* | 12/2014 | Chiesa | H04L 9/12 380/256 |
| 2015/0085877 A1 | 3/2015 | Kono et al. | |
| 2016/0056886 A1* | 2/2016 | Kitamura | H04Q 11/0062 398/5 |
| 2018/0006766 A1 | 1/2018 | Ko et al. | |

FOREIGN PATENT DOCUMENTS

| | | |
|---|---|---|
| CN | 102439995 A | 5/2012 |
| JP | 2007074256 A | 3/2007 |
| JP | 2012147479 A | 8/2012 |
| JP | 2015065578 A | 4/2015 |
| KR | 1020050072637 A | 7/2005 |
| KR | 1020110069655 A | 6/2011 |
| KR | 20130003614 A | 1/2013 |
| WO | 2012070837 A3 | 9/2012 |
| WO | 2013125621 A1 | 8/2013 |

OTHER PUBLICATIONS

"IEEE Standard for Ethernet", Section Six, vol. 1149, Oct. 15, 2012, 400 pages.

* cited by examiner

PCSL0 | 16383 66bit bit blocks | AM | 16383 66bit bit blocks | Link ID | 16383 66bit bit blocks | AM | 16383 66bit bit blocks | Link ID | 16383 66bit bit blocks |

PCSL1 | 16383 66bit bit blocks | AM | 16383 66bit bit blocks | Link ID | 16383 66bit bit blocks | AM | 16383 66bit bit blocks | Link ID | 16383 66bit bit blocks |

⋮

PCSLN | 16383 66bit bit blocks | AM | 16383 66bit bit blocks | Link ID | 16383 66bit bit blocks | AM | 16383 66bit bit blocks | Link ID | 16383 66bit bit blocks |

FIG. 3

| PCSL number | Code $\{M_0, M_1, M_2, BIP_3, M_4, M_5, M_6, BIP_7\}$ | PCSL number | Code $\{M_0, M_1, M_2, BIP_3, M_4, M_5, M_6, BIP_7\}$ |
|---|---|---|---|
| 0 | 0xC1, 0x68, 0x21, $BIP_3$, 0x3E, 0x97, 0xDE, $BIP_7$ | 10 | 0xFD, 0x6C, 0x99, $BIP_3$, 0x02, 0x93, 0x66, $BIP_7$ |
| 1 | 0x9D, 0x71, 0x8E, $BIP_3$, 0x62, 0x8E, 0x71, $BIP_7$ | 11 | 0xB9, 0x91, 0x55, $BIP_3$, 0x46, 0x6E, 0xAA, $BIP_7$ |
| 2 | 0x59, 0x4B, 0xE8, $BIP_3$, 0xA6, 0xB4, 0x17, $BIP_7$ | 12 | 0x5C, 0xB9, 0xB2, $BIP_3$, 0xA3, 0x46, 0x4D, $BIP_7$ |
| 3 | 0x4D, 0x95, 0x7B, $BIP_3$, 0xB2, 0x6A, 0x84, $BIP_7$ | 13 | 0x1A, 0xF8, 0xBD, $BIP_3$, 0xE5, 0x07, 0x42, $BIP_7$ |
| 4 | 0xF5, 0x07, 0x09, $BIP_3$, 0x0A, 0xF8, 0xF6, $BIP_7$ | 14 | 0x83, 0xC7, 0xCA, $BIP_3$, 0x7C, 0x36, 0x35, $BIP_7$ |
| 5 | 0xDD, 0x14, 0xC2, $BIP_3$, 0x22, 0xEB, 0x3D, $BIP_7$ | 15 | 0x35, 0x36, 0xCD, $BIP_3$, 0xCA, 0xC9, 0x32, $BIP_7$ |
| 6 | 0x9A, 0x4A, 0x26, $BIP_3$, 0x65, 0xB5, 0xD9, $BIP_7$ | 16 | 0xC4, 0x31, 0x4C, $BIP_3$, 0x3B, 0xCE, 0xB3, $BIP_7$ |
| 7 | 0x7B, 0x45, 0x66, $BIP_3$, 0x84, 0xBA, 0x99, $BIP_7$ | 17 | 0xAD, 0xD6, 0xB7, $BIP_3$, 0x52, 0x29, 0x48, $BIP_7$ |
| 8 | 0xA0, 0x24, 0x76, $BIP_3$, 0x5F, 0xDB, 0x89, $BIP_7$ | 18 | 0x5F, 0x66, 0x2A, $BIP_3$, 0xA0, 0x99, 0xD5, $BIP_7$ |
| 9 | 0x68, 0xC9, 0xFB, $BIP_3$, 0x97, 0x36, 0x04, $BIP_7$ | 19 | 0xC0, 0xF0, 0xE5, $BIP_3$, 0x3F, 0x0F, 0x1A, $BIP_7$ |

FIG. 4

Chart A

| PCSL0 | LinkIDx |
| PCSL1 | LinkIDy |
| ... | ... |
| PCSLN | LinkIDz |

Chart B

| PCSL0 | LinkIDx |
| PCSL1 | LinkIDy |
| ... | ... |
| PCSLN | LinkIDz |

METHODS AND DEVICES FOR IMPLEMENTING FLEXIBLE ETHERNET WITHIN A PHYSICAL CODING SUBLAYER

CROSS-REFERENCE TO RELATED APPLICATIONS

This application is a continuation of International Application No. PCT/CN2013/089549, filed Dec. 16, 2013, which is hereby incorporated by reference in its entirety.

TECHNICAL FIELD

The present invention relates to the communications field, and in particular, to a data transmission method, device, and system.

BACKGROUND

A Flexible/Sliceable Ethernet (FlexEth for short) may be used to configure one Ethernet port as multiple virtual Ethernet ports, so that one Ethernet link is split into multiple virtual Ethernet links (a virtual Ethernet link obtained after splitting is referred to as a sub-Ethernet link). These sub-Ethernet links maybe connected to different routers or switches. During specific implementation, the sub-Ethernet links may be allocated according to a physical coding sublayer lane (PCSL for short). For example, a physical layer device that performs transmission at a rate of 100 Gbits/s (G stands for $10^9$, s stands for second, and bits/s stands for bits per second) has 20 PCSLs. In this way, one sub-Ethernet link thereof may contain PCSLs of any quantity of 1 to 20.

When a flexible Ethernet is used, an issue that needs to be resolved is how to identify and extract a signal of a corresponding sub-Ethernet link from signals of the entire flexible Ethernet. An existing method is adding an auto-negotiation (AN for short) sublayer to a physical layer to identify a sub-Ethernet link. The AN sublayer is located below a physical coding sublayer (PCS for short) and a physical medium dependent (PMD for short) sublayer. Therefore, the AN sublayer does not process a PCSL, and can process only a physical lane (Physical Lane, corresponding to an optical lane if an optical interconnection is used).

The existing method of adding an AN sublayer is only used to negotiate a bit rate of an Ethernet link. However, the FlexEth generally uses an optical interconnection. In this case, a rate of transmitting or receiving a signal on a single optical lane is generally determinate and cannot be changed, and therefore, a bit rate of a flexible Ethernet link does not need to be negotiated. In addition, a quantity of PCSLs is not necessarily the same as a quantity of Optical Lanes. The quantity of PCSLs is not less than the quantity of Optical Lanes. In a case in which the quantity of PCSLs is greater than the quantity of Optical Lanes, adding an AN sublayer below a PMD sublayer cannot help identify which sub-Ethernet link to which a PCSL belongs. Therefore, in the prior art, the issue of how to identify and extract a signal of a corresponding sub-Ethernet link from signals of the entire flexible Ethernet basically cannot be resolved.

SUMMARY

Embodiments of the present invention provide a data transmission method, device, and system, to acquire attribution information of a PCSL, so as to resolve an issue of how to identify and extract a signal of a corresponding sub-Ethernet link from signals of an entire flexible Ethernet.

To achieve the foregoing objective, the following technical solutions are used in the embodiments of the present invention:

According to a first aspect, a data transmission method is provided, including:

inserting a feature code block into a physical coding sublayer PCS to form a physical coding sublayer lane PCSL, where the feature code block is used to represent an Ethernet link to which the PCSL belongs; and sending the PCSL.

With reference to the first aspect, in a first possible implementation manner, there is one feature code block or one alignment marker AM at each of locations of which each spacing is a preset quantity of bit blocks in the PCSL, where the AM is used to identify a sequence number of the PCSL.

With reference to the first possible implementation manner, in a second possible implementation manner, a quantity of consecutive locations, at which there are AMs, of the locations of which each spacing is the preset quantity of bit blocks in the PCSL is not less than a first preset quantity, where the first preset quantity is a quantity required to lock an AM;

a quantity of consecutive locations, at which there are feature code blocks, of the locations of which each spacing is the preset quantity of bit blocks in the PCSL is less than a second preset quantity, where the second preset quantity is a quantity required to detect out-of-lock of an AM; and the inserting a feature code block into a PCS to form a PCSL, where the feature code block is used to represent an Ethernet link to which the PCSL belongs, and sending the PCSL further includes: inserting feature code blocks into the PCS to form at least two PCSLs, where the feature code block is used to represent that the at least two PCSLs belong to a same Ethernet link, and sequence numbers of the at least two PCSLs are nonconsecutive; and sending the at least two PCSLs.

With reference to the first aspect or the first or second possible implementation manner, in a third possible implementation manner, the feature code block includes a link identity LinkID, where the LinkID is used to identify a sequence number of the Ethernet link to which the PCSL belongs, and the LinkID uses a same coding method as an alignment marker AM.

With reference to the third possible implementation manner, in a fourth possible implementation manner, the feature code block further includes the following information of a transmit end: an identity NEG indicating whether Ethernet auto-negotiation is supported, an identity NdID of an affiliated node, and an acknowledgement identity Ack, where the NEG, the NdID, the Ack, and the LinkID are used for negotiation, so as to determine the Ethernet link to which the PCSL belongs.

According to a second aspect, a data transmission method is provided, including:

receiving a physical coding sublayer lane PCSL; and determining, according to a feature code block inserted into the PCSL, an Ethernet link to which the PCSL belongs.

With reference to the second aspect, in a first possible implementation manner, there is one feature code block or one alignment marker AM at each of locations of which each spacing is a preset quantity of bit blocks in the PCSL, where the AM is used to identify a sequence number of the PCSL;

a quantity of consecutive locations, at which there are AMs, of the locations of which each spacing is the preset quantity of bit blocks in the PCSL is not less than a first preset quantity, where the first preset quantity is a quantity required to lock an AM;

a quantity of consecutive locations, at which there are feature code blocks, of the locations of which each spacing is the preset quantity of bit blocks in the PCSL is less than a second preset quantity, where the second preset quantity is a quantity required to detect out-of-lock of an AM; and the receiving a PCSL, and determining, according to a feature code block inserted into the PCSL, an Ethernet link to which the PCSL belongs further includes: receiving at least two PCSLs, and determining, according to feature code blocks inserted into the at least two PCSLs, that the at least two PCSLs belong to a same Ethernet link, where sequence numbers of the at least two PCSLs are nonconsecutive.

With reference to the second aspect or the first possible implementation manner, in a second possible implementation manner, the feature code block includes a link identity LinkID, and the determining, according to a feature code block inserted into the PCSL, an Ethernet link to which the PCSL belongs includes:

determining, according to the link identity LinkID inserted into the PCSL, the Ethernet link to which the PCSL belongs.

With reference to the second possible implementation manner, in a third possible implementation manner, the feature code block further includes the following information of a transmit end: an identity NEG indicating whether Ethernet auto-negotiation is supported, an identity NdID of an affiliated node, and an acknowledgement identity Ack; and the determining, according to a feature code block inserted into the PCSL, an Ethernet link to which the PCSL belongs includes:

determining priorities of the transmit end and a receive end according to an identity NEG indicating whether the receive end supports Ethernet auto-negotiation and the identity NEG, of the transmit end, indicating whether Ethernet auto-negotiation is supported in the received PCSL, where a priority of an end that does not support auto-negotiation is higher;

determining the priorities of the transmit end and the receive end according to an identity NdID of a node to which the receive end belongs and the identity NdID of the node to which the transmit end belongs in the received PCSL; and confirming, according to a link identity number LinkID of the receive end and the link identity number LinkID of the transmit end in the received PCSL, a sequence number of the Ethernet link to which the corresponding PCSL belongs, selecting a LinkID of the end having a higher priority as the home Ethernet link of the PCSL, and ensuring, according to an acknowledgement identity Ack of the receive end and the acknowledgement identity Ack of the transmit end in the received PCSL, that information, determined by the receive end and the transmit end, about the Ethernet link to which the PCSL belongs is consistent.

According to a third aspect, a transmit end is provided, including:

a data processing unit, configured to insert a feature code block into a physical coding sublayer PCS to form a physical coding sublayer lane PCSL, where the feature code block is used to represent an Ethernet link to which the PCSL belongs; and a sending unit, configured to send the PCSL formed by the data processing unit.

With reference to the third aspect, in a first possible implementation manner, there is one feature code block or one alignment marker AM at each of locations of which each spacing is a preset quantity of bit blocks in the PCSL, where the AM is used to identify a sequence number of the PCSL.

With reference to the third aspect or the first possible implementation manner, in a second possible implementation manner, a quantity of consecutive locations, at which there are AMs, of the locations of which each spacing is the preset quantity of bit blocks in the PCSL is not less than a first preset quantity, where the first preset quantity is a quantity required to lock an AM; and a quantity of consecutive locations, at which there are feature code blocks, of the locations of which each spacing is the preset quantity of bit blocks in the PCSL is less than a second preset quantity, where the second preset quantity is a quantity required to detect out-of-lock of an AM.

With reference to the third aspect or the first or second possible implementation manner, in a third possible implementation manner, the feature code block includes a link identity LinkID, where the LinkID is used to identify a sequence number of the Ethernet link to which the PCSL belongs, and the LinkID uses a same coding method as an alignment marker AM.

With reference to the third possible implementation manner, in a fourth possible implementation manner, the feature code block further includes the following information of the transmit end: an identity NEG indicating whether Ethernet auto-negotiation is supported, an identity NdID of an affiliated node, and an acknowledgement identity Ack, where the NEG, the NdID, the Ack, and the LinkID are used for negotiation, so as to determine the Ethernet link to which the PCSL belongs.

According to a fourth aspect, a receive end is provided, including:

a receiving unit, configured to receive a physical coding sublayer lane PCSL; and a processing unit, configured to determine, according to a feature code block inserted into the PCSL received by the receiving unit, an Ethernet link to which the PCSL belongs.

With reference to the fourth aspect, in a first possible implementation manner, there is one feature code block or one alignment marker AM at each of locations of which each spacing is a preset quantity of bit blocks in the PCSL, where the AM is used to identify a sequence number of the PCSL.

With reference to the fourth aspect or the first possible implementation manner, in a second possible implementation manner, the feature code block includes a link identity LinkID, and the processing unit is specifically configured to:

determine, according to the link identity LinkID inserted into the PCSL received by the receiving unit, the Ethernet link to which the PCSL belongs.

With reference to the second possible implementation manner, in a third possible implementation manner, the feature code block further includes the following information of a transmit end: an identity NEG indicating whether Ethernet auto-negotiation is supported, an identity NdID of an affiliated node, and an acknowledgement identity Ack; and the processing unit includes:

a priority determining subunit, configured to determine priorities of the transmit end and the receive end according to an identity NEG indicating whether the receive end supports Ethernet auto-negotiation and the identity NEG, of the transmit end, indicating whether Ethernet auto-negotiation is supported in the received PCSL, where a priority of an end that does not support auto-negotiation is higher; and determine the priorities of the transmit end and the receive end according to an identity NdID of a node to which the receive end belongs and the identity NdID of the node to which the transmit end belongs in the received PCSL; and a lane attribution determining subunit, configured to confirm, according to a link identity number LinkID of the receive end and the link identity number LinkID of the transmit end in the received PCSL, a sequence number of the Ethernet link to which the corresponding PCSL belongs, select a LinkID of the end having a higher priority as the home Ethernet link of the PCSL, and ensure, according to an acknowledgement identity Ack of the receive end and the acknowledgement identity Ack of the transmit end in the received PCSL, that information, determined by the receive end and the transmit end, about the Ethernet link to which the PCSL belongs is consistent.

According to a fifth aspect, a PCSL attribution processing device is provided, including the foregoing any transmit end and/or the foregoing any receive end.

According to a sixth aspect, a data transmission system is provided, including a PCS layer device and a PCSL attribution processing device, where the PCSL attribution processing device is the foregoing PCSL attribution processing device.

According to the data transmission method, apparatus, device, and system provided in the foregoing solutions, sub-Ethernet information used to represent PCSL attribution is inserted between bit blocks of a physical coding sublayer PCS, so that a receive end can directly acquire PCSL attribution information, so as to resolve an issue of how to identify and extract a signal of a corresponding sub-Ethernet link from signals of an entire flexible Ethernet.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a schematic diagram of a data structure of a data transmission method according to an embodiment of the present invention;

FIG. 4 is a schematic structural diagram of an AM code according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In this application, Ethernet processing based on an Ethernet link mainly relates to functions of a data link layer and a physical layer in an Open System Interconnection seven-layer model defined by the ISO (international organization for standardization, International Organization for Standardization), and is mainly applied to operations in processes of sending and receiving a bit block at a PCS (physical coding sublayer).

Figure 1:
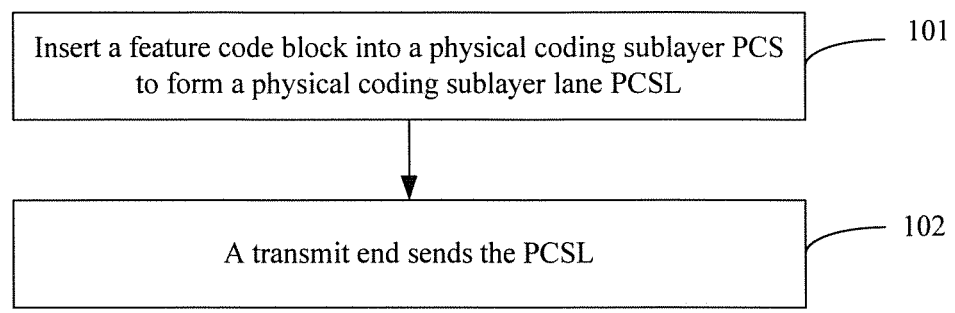
FIG. 1 is a schematic flowchart of a data transmission method according to an embodiment of the present invention.

Referring to FIG. 1, an embodiment of the present invention provides a data transmission method, which is applied to a transmit end and includes the following steps:

101. Insert a feature code block into a physical coding sublayer PCS to form a physical coding sublayer lane PCSL, where the feature code block is used to represent an Ethernet link to which the PCSL belongs.

Optionally, in step 101, the transmit end selectively inserts a feature code block and an AM between bit blocks of the physical coding sublayer PCS, which specifically implements the following PCSL: there is one feature code block or one alignment marker AM at each of locations of which each spacing is a preset quantity of bit blocks in the PCSL, where the AM is used to identify a sequence number of the PCSL. Further, a quantity of consecutive locations, at which there are AMs, of the locations of which each spacing is the preset quantity of bit blocks in the PCSL is not less than a first preset quantity, where the first preset quantity is a quantity required to lock an AM; and a quantity of consecutive locations, at which there are feature code blocks, of the locations of which each spacing is the preset quantity of bit blocks in the PCSL is less than a second preset quantity, where the second preset quantity is a quantity required to detect out-of-lock of an AM. According to the prior art, in a process of sending a PCSL, a transmit end generally inserts an alignment marker AM (Alignment Marker, alignment marker) between bit blocks of a physical coding sublayer, where the AM is used to identify a sequence number of the physical coding sublayer lane, and a quantity of AMs consecutively sent by the transmit end is not less than a quantity required by a receive end to lock an AM. Specifically, in the prior art, there is one AM at each of locations of which each spacing is a preset quantity of bit blocks. In the present invention, there is one feature code block or one AM at each of locations of which each spacing is a preset quantity of bit blocks, that is, an AM or a feature code block is sent at an existing AM sending location. Therefore, it is only required to insert feature code blocks into some locations at which AMs are originally inserted in the prior art. In addition, considering compatibility with an existing AM detection mechanism, a quantity of feature code blocks consecutively sent by a transmit end needs to be less than a quantity required by a receive end for detecting out-of-lock of an AM, and a quantity of AMs consecutively sent by the transmit end is not less than a quantity required by the receive end for detecting locking of an AM.

Feature code blocks inserted into at least two PCSLs included in all PCSLs sent by the transmit end are used to determine that the at least two PCSLs belong to a same Ethernet link, where sequence numbers of the at least two PCSLs may be nonconsecutive.

Optionally, the feature code block includes a link identity LinkID, where the LinkID is used to identify a sequence number of the Ethernet link to which the PCSL belongs. Optionally, the LinkID may use a same coding method as an alignment marker AM.

102. Send the PCSL.

Figure 2:
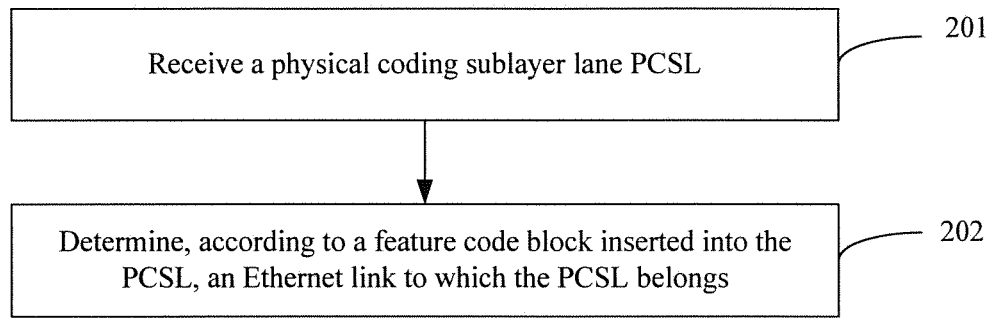
FIG. 2 is a schematic flowchart of another data transmission method according to an embodiment of the present invention.

Referring to FIG. 2, an embodiment of the present invention further provides a data transmission method, which is applied to a receive end and includes:

201. Receive a physical coding sublayer lane PCSL.

The physical coding sublayer lane PCSL is sent by a transmit end.

202. Determine, according to a feature code block inserted into the PCSL, an Ethernet link to which the PCSL belongs.

Optionally, specifically, step 202 further includes: there is one feature code block or one alignment marker AM at each of locations of which each spacing is a preset quantity of bit blocks in the PCSL, where the AM is used to identify a sequence number of the PCSL. Further, a quantity of consecutive locations, at which there are AMs, of the locations of which each spacing is the preset quantity of bit blocks in the PCSL is not less than a first preset quantity, where the first preset quantity is a quantity required to lock an AM; and a quantity of consecutive locations, at which there are feature code blocks, of the locations of which each spacing is the preset quantity of bit blocks in the PCSL is less than a second preset quantity, where the second preset quantity is a quantity required to detect out-of-lock of an AM.

Optionally, the feature code block includes a link identity LinkID, and step 202 specifically includes: determining, by the receive end according to the link identity LinkID inserted into the PCSL, the Ethernet link to which the PCSL belongs.

For example, according to the foregoing embodiment, it may be implemented that a receive end identifies attribution of a PCSL used by a transmit end, that is, the PCSL belongs to which Ethernet link. PCSL attribution identification is a basis of PCSL attribution acknowledgement or negotiation. Specifically, an AM or a feature code block may be sent at an existing AM sending location. For example, as stipulated in IEEE 802.3 Section 6, one AM is inserted into each PCSL every other 16383 66-bit blocks, which is changed to that an AM or a feature code block is sent every other 16383 66-bit blocks in each PCSL in the present invention, as shown in FIG. 3.

A method for sending an AM and a feature code block is as follows: In each PCSL, a quantity of AMs consecutively sent is not less than a quantity (as stipulated in IEEE 802.3 Section 6, a lock state is entered when two valid AMs that identify a same PCSL sequence number are consecutively detected) required to lock an AM, and a quantity of feature code blocks consecutively sent is less than a quantity (as stipulated in IEEE 802.3 Section 6, an out-of-lock state is entered when four AMs whose PCSL sequence numbers disaccord with a PCSL sequence number in a locked AM are consecutively detected) required to detect out-of-lock of an AM. For example, it may be that three AMs are consecutively sent, then one feature code block is sent, then three AMs are consecutively sent, and then one feature code is sent, in a cyclic manner.

As shown in FIG. 3, a feature code block includes a link identity LinkID, where the LinkID is used to identify a sequence number of an Ethernet link to which a PCSL belongs. In FIG. 3, the feature code block is represented by a LinkID, that is, the LinkID is used to represent an Ethernet link to which a PCSL belongs. In this way, a change to an existing AM mechanism is slight, and existing AM detection is basically not affected.

The following provides LinkID design. No scrambling code is required for existing AM information. Therefore, an AM needs to be specially designed. Equalization between "1" and "0", and direct current balance of electrical signals need to be considered. The existing 40GBASE-R and 100GBASE-R both have a standard AM definition. A LinkID used for PCSL attribution information is newly added, where the LinkID is at a same location as an existing AM. Therefore, it is the best that LinkID design should meet the foregoing AM design requirement. On the other hand, the LinkID needs to designate a home sub-Ethernet link of a PCSL. A FlexEth allocates sub-Ethernet links by using a PCSL as a unit. In an extreme case, a quantity of sub-Ethernet links should be equal to a quantity of PCSLs, that is, one sub-Ethernet link contains at least one PCSL. When one sub-Ethernet link contains more than two PCS Lanes, sequence numbers of these PCSLs may be consecutive or may be nonconsecutive. Specifically, attribution of each PCSL is determined by using PCSL attribution information (LinkID) inserted between data blocks of the PCSL. According to the foregoing considerations, an AM code in an existing AM definition is used to indicate the sub-Ethernet link, where a sequence number of the sub-Ethernet link is equivalent to a sequence number of a PCSL corresponding to the AM code.

The 100GBASE-R is used as an example. Assuming that PCSL0 belongs to sub-Ethernet link #8 (sub-Ethernet links are also numbered from 0), an AM corresponding to PCSL0 is "0xC1, 0x68, 0x21, $BIP_3$, 0x3E, 0x97, 0xDE, $BIP_7$" (see an AM code in FIG. 4), and PCSL attribution information corresponding to PCSL0 is "0xA0, 0x24, 0x76, $BIP_3$, 0x5F, 0xDB, 0x89, $BIP_7$" (in FIG. 4, this code is an AM code of PCSL8, and is used herein to indicate that the corresponding PCSL belongs to sub-Ethernet link #8).

In this way, existing AM design is maximally used and hardware changes are slight; and in addition, sub-Ethernet links are flexibly allocated, which can support that spaced PCSLs belong to a same sub-Ethernet link. In this way, modifying a sub-Ethernet link configuration does not affect an existing service.

A receive end easily locks and extracts PCSL attribution information according to a rule of a transmit end. First, an AM is locked according to an AM detection mechanism (as stipulated in IEEE 802.3 Section 6, a lock state is entered when two valid Alignment Markers are consecutively detected). Second, a LinkID is detected according to the foregoing insertion rule. Because a method for inserting a LinkID does not affect locking or out-of-lock of an AM, on a basis of locking an AM, it may be detected whether a control block, at an AM location, detected after two consecutive correct AMs (the so-called correct AMs refer to same AMs that meet an AM coding rule (referred to as valid AMs in this case)) also meets the coding rule, and whether a fixed quantity of same codes can be consecutively detected according to a same rule. In this case, the control block at this AM location can be locked, and the control block at this AM location is a LinkID. A LinkID out-of-lock method may be simply analogized, and is not described again.

Further, in the present invention, data transmission is performed according to PCSL attribution information represented by a feature code block. That is, bit blocks (66 bit blocks for the 40GBASE-R or the 100GBASE-R) belonging to a same sub-Ethernet link are alternately delivered to affiliated PCSLs. For example, PCSLs belonging to sub-Ethernet link #0 are PCSL #1, PCSL #3, and PCSL #7. The first bit block belonging to sub-Ethernet link #0 is sent to PCSL #1, the second bit block is sent to PCSL #3, the third bit block is sent to PCSL #7, the fourth bit block is sent to PCSL #1, the fifth bit block is sent to PCSL #3, and the bit blocks are sent to a receive end by means of sending the PCSLs.

Figure 5:
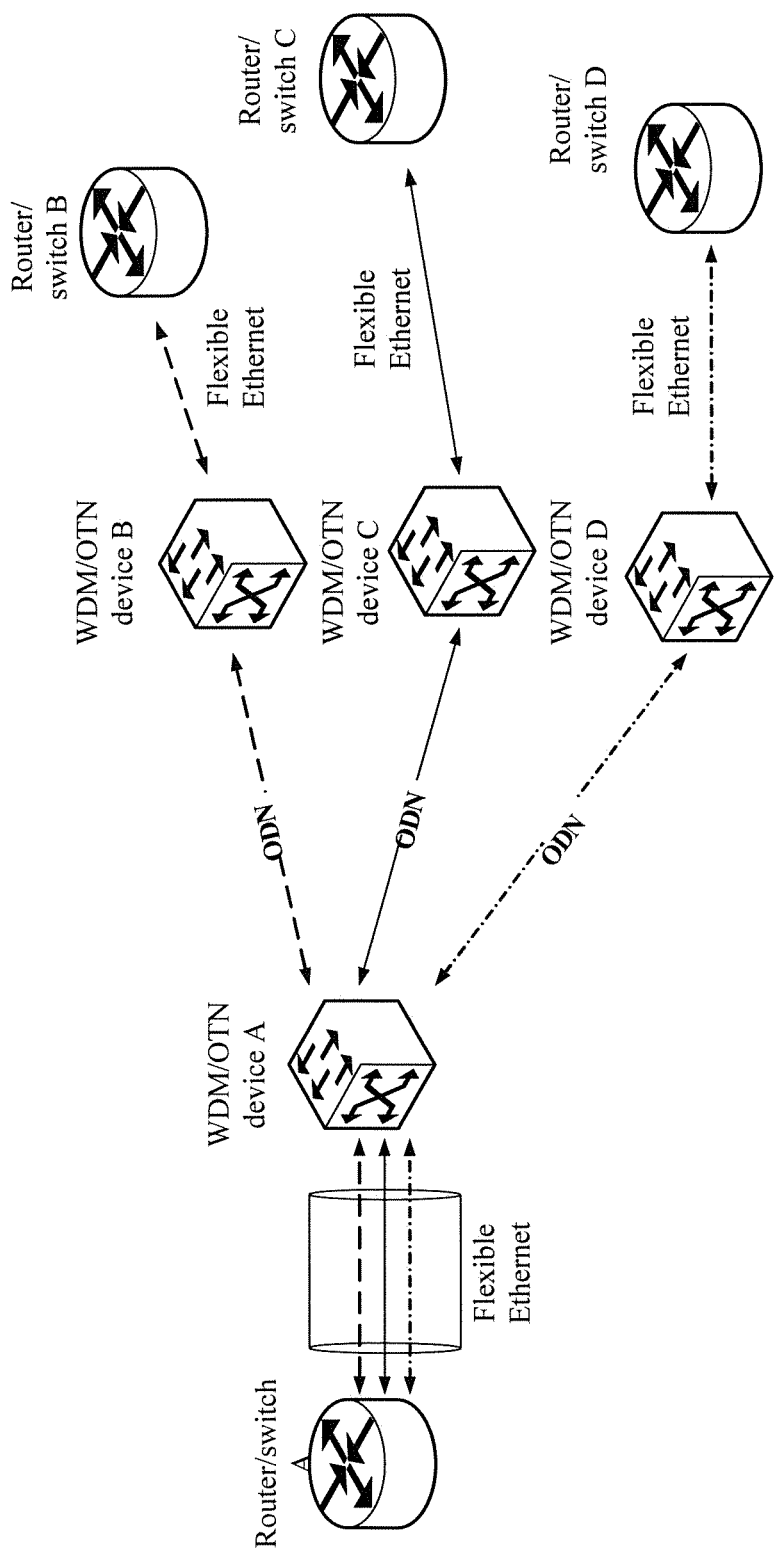
FIG. 5 is a schematic structural diagram of a network system according to an embodiment of the present invention.

According to the foregoing data transmission method, acknowledgement of PCSL attribution can be implemented. For details, refer to a network system shown in FIG. 5. The network system is generally used in a case in which FlexEth signals between routers/switches are interconnected through a WDM/OTN (Wavelength Division Multiplexing/Optical Transport Network, wavelength division multiplexing/optical transport network) network. In this case, an Ethernet signal is generally encapsulated into an ODU (Optical channel Data Unit, optical channel data unit) pipeline on a WDM/OTN device, and then is transmitted. At this moment, a FlexEth signal interconnection is also used between a router/switch and the WDM/OTN device. However, in the FlexEth, allocation of a pipeline size of a sub-Ethernet link is determined by the router/switch.

In this case, as described above, it is only required to insert a LinkID into a proper AM location, so that the WDM/OTN device can complete acknowledgement of PCSL attribution in the FlexEth. Apparently, this method is also applicable to a case of an Ethernet interconnection in which a high priority can be set for a port. That is, when a high priority is set for a port according to a network demand, a LinkID is inserted between bit blocks in a PCSL corresponding to the port, so as to enable a receive end to configure, after identification, a home Ethernet link of the PCSL according to a configuration of the port with a high priority.

Figure 6:
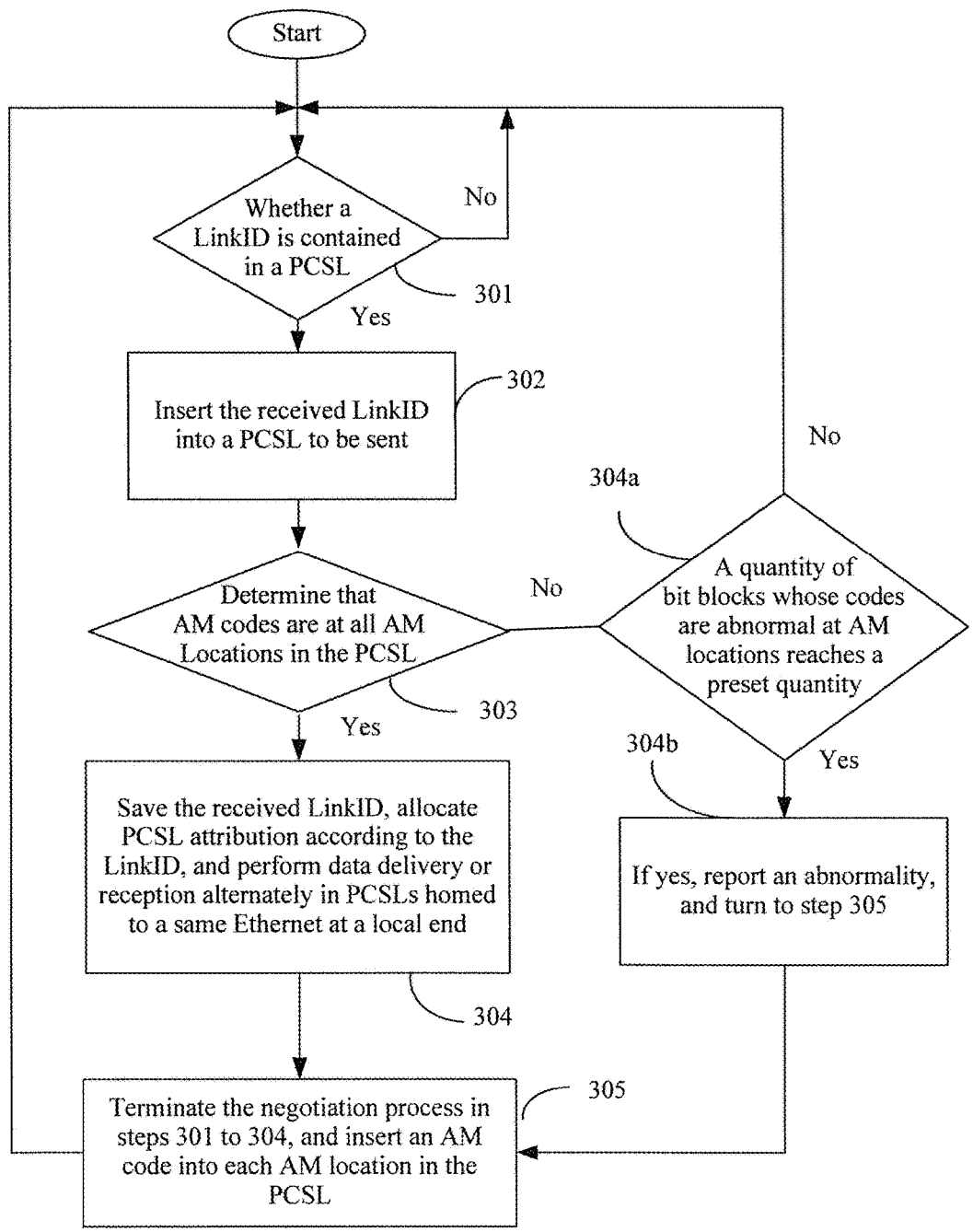
FIG. 6 is a schematic diagram of a LinkID confirmation process according to an embodiment of the present invention.

A specific method includes: in a case in which a FlexEth configuration does not need to be changed or is in an initial state, inserting an AM code at an AM location for each PCS Lane. Then, when the FlexEth configuration needs to be changed for a port on a router/switch, a transmit end of the port on the router/switch inserts, according to a configuration status, a feature code block LinkID at a proper location according to the method provided in step 101 of this application. After a port on a WDM/OTN device receives the LinkID, the port on the WDM/OTN device is configured according to an identity of the LinkID. A receive end of a FlexEth port on a WDM/OTN device is used as an example (the FlexEth port on the WDM/OTN device is used for a WDM/OTN device, and two mutually connected ports are respectively referred to as a local end and a peer end. In this example, the FlexEth port on the WDM/OTN device is referred to as a local end, and a FlexEth port on a router/switch is referred to as a peer end. In another case, processing may be obtained by means of simple reasoning or may be similar, and is not described again). Referring to FIG. 6, an acknowledgement process is as follows:

301. Determine whether a PCSL received by a receive end at a local end contains a feature code block LinkID.

302. If yes, insert a LinkID into a PCSL to be sent by a transmit end at the local end, where a field identifying a sequence number of an Ethernet link in the LinkID inserted by the transmit end at the local end is the same as that in the LinkID received by the receive end at the local end.

303. Determine whether bit blocks at all AM locations in the PCSL received by the receive end at the local end use AM coding.

304. If yes, save the received LinkID, allocate PCSL attribution according to the LinkID, and perform data delivery or reception alternately in PCSLs homed to a same Ethernet at the local end.

305. Terminate the negotiation process in steps 301 to 304, and insert an AM code into each AM location in the PCSL.

After step 303, the process further includes:

304*a*. If no, count bit blocks whose codes are abnormal at the AM locations, and determine whether a quantity of bit blocks whose codes are abnormal reaches a preset quantity.

304*b*. If yes, report an abnormality, and turn to step 305.

304*c*. If no, turn to step 301.

Further, on a basis of inserting a LinkID to identify a home Ethernet link of a PCSL, a feature code block may further be used to perform negotiation. In this case, insertion of a feature code block may also be limited to a PCSL that needs to be changed, to reduce impact on an existing service. An embodiment of the present invention provides a negotiation-based data transmission method. A PCSL attribution negotiation mechanism is implemented on a basis of acknowledgement of PCSL attribution information. That is, a negotiation mechanism (below referred to as FlexEth negotiation) that is of a FlexEth and is for allocating sub-Ethernet links to two connected FlexEth ports is established.

Figure 7:
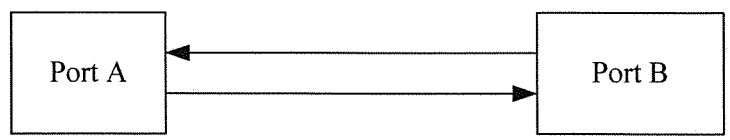
FIG. 7 is a schematic structural diagram of a sub-Ethernet link port mapping table according to an embodiment of the present invention.
Figure 8:
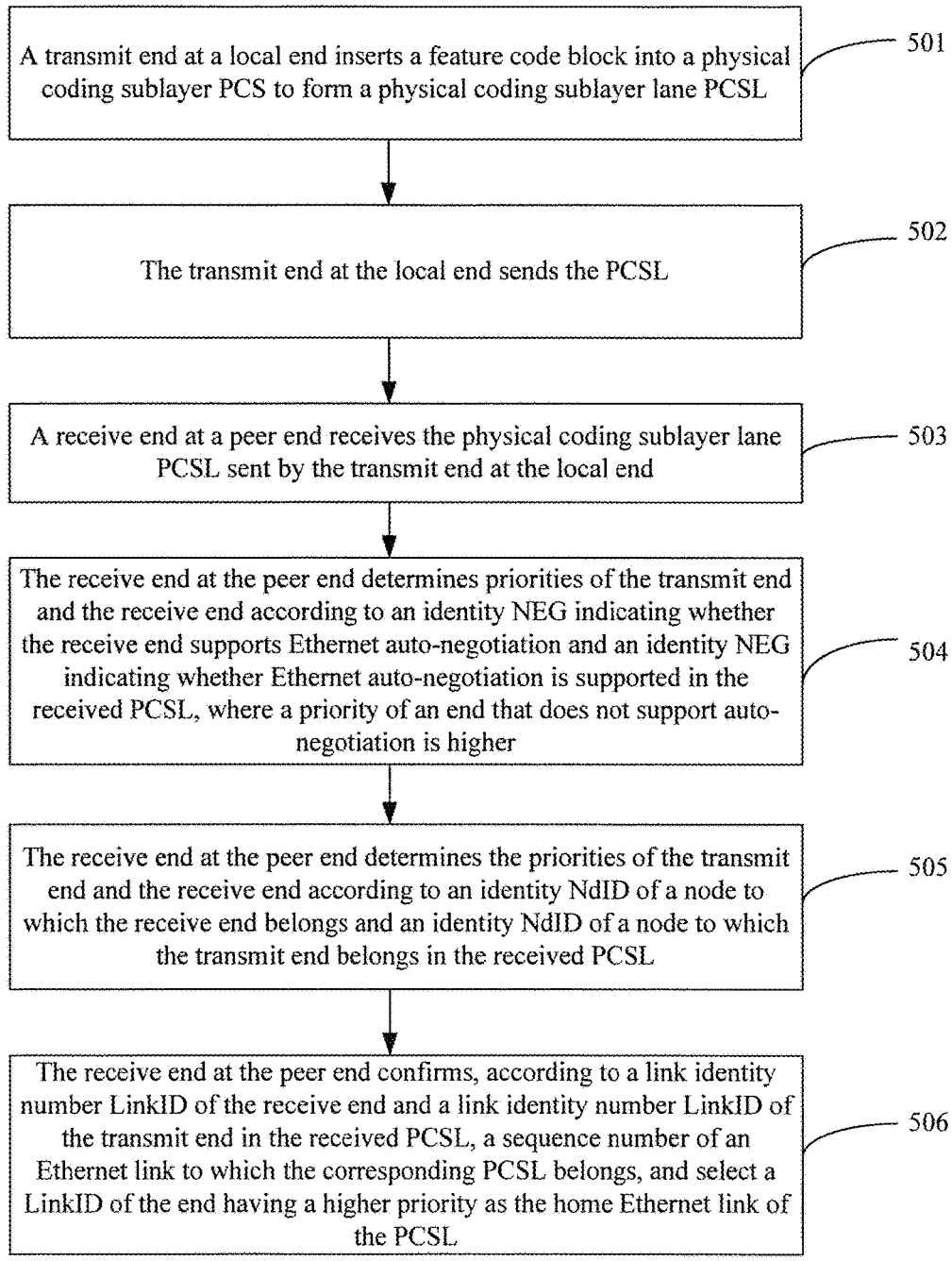
FIG. 8 is a schematic flowchart of a data transmission method according to another embodiment of the present invention.

Difficulties in FlexEth negotiation mainly lie in that: initial definitions, of two ports under negotiation, about a sub-Ethernet link may be different, and some sub-Ethernet links may be working. First, FlexEth negotiation needs to ensure that two ports reach an agreement on allocation of sub-Ethernet links. Second, during the negotiation, a pipeline for transferring auto-negotiation information needs to be limited, avoiding dislocation and impact on an existing service. As shown in FIG. 7, an initial mapping table of a port A is a chart A, and an initial mapping table of a port B is a chart B. That is, mapping relationships between PCSLs of ports and LinkIDs may be initially inconsistent, but need to keep consistent finally. A main method is inserting auto-negotiation information at an existing AM location by using a PCSL as a unit, and on this basis, performing negotiation by two ports. Referring to FIG. 8, the method specifically includes the following steps:

501. A transmit end at a local end inserts a feature code block into a physical coding sublayer PCS to form a physical coding sublayer lane PCSL, where the feature code block is used to represent an Ethernet link to which the PCSL belongs.

Optionally, in step 501, the transmit end selectively inserts a feature code block and an AM between bit blocks of the physical coding sublayer PCS, which specifically implements the following PCSL: there is one feature code block or one alignment marker AM at each of locations of which each spacing is a preset quantity of bit blocks in the PCSL, where the AM is used to identify a sequence number of the PCSL. Further, a quantity of consecutive locations, at which there are AMs, of the locations of which each spacing is the preset quantity of bit blocks in the PCSL is not less than a first preset quantity, where the first preset quantity is a quantity required to lock an AM; and a quantity of consecutive locations, at which there are feature code blocks, of the locations of which each spacing is the preset quantity of bit blocks in the PCSL is less than a second preset quantity, where the second preset quantity is a quantity required to detect out-of-lock of an AM. According to the prior art, in a process of sending a PCSL, a transmit end generally inserts an alignment marker AM (Alignment Marker, alignment marker) between bit blocks of a physical coding sublayer, where the AM is used to identify a sequence number of the physical coding sublayer lane. Specifically, in the prior art, there is one AM at each of locations of which each spacing is a preset quantity of bit blocks. In the present invention, there is one feature code block or one AM at each of locations of which each spacing is a preset quantity of bit blocks, that is, an AM or a feature code block is sent at an existing AM sending location. Therefore, it is only required to insert feature code blocks into some locations at which AMs are originally inserted in the prior art. In addition, considering compatibility with an existing AM detection mechanism, a quantity of feature code blocks consecutively sent by a transmit end needs to be less than a quantity required by a receive end for detecting out-of-lock of an AM, and a quantity of AMs consecutively sent by the transmit end is not less than a quantity required by the receive end for detecting locking of an AM.

Feature code blocks inserted into at least two PCSLs included in all PCSLs sent by the transmit end are used to determine that the at least two PCSLs belong to a same Ethernet link, where sequence numbers of the at least two PCSLs may be nonconsecutive.

Optionally, the feature code block includes a link identity LinkID, where the LinkID is used to identify a sequence number of the Ethernet link to which the PCSL belongs. Optionally, the LinkID may use a same coding method as an alignment marker AM.

502. The transmit end at the local end sends the PCSL.

Optionally, the feature code block further includes the following information of the transmit end: an identity NEG indicating whether Ethernet auto-negotiation is supported, an identity NdID of an affiliated node, and an acknowledgement identity Ack, where the NEG, the NdID, the Ack, and the LinkID are used by the transmit and a receive end to perform mutual negotiation, so as to determine the Ethernet link to which the PCSL belongs.

503. A receive end at a peer end receives the physical coding sublayer lane PCSL sent by the transmit end at the local end.

In step 503, the AM is used to identify the sequence number of the physical coding sublayer lane. Therefore, the receive end performs re-sequencing on the received PCSL according to the AM, so as to restore correct data.

504. The receive end at the peer end determines priorities of the transmit end (that is, the transmit end at the local end) and the receive end according to an identity NEG indicating whether the receive end supports Ethernet auto-negotiation and the identity NEG, of the transmit end at the local end, indicating whether Ethernet auto-negotiation is supported in the received PCSL (which is also equivalent to determining priorities of the local end and the peer end), where a priority of an end that does not support auto-negotiation is higher.

505. The receive end at the peer end determines the priorities of the transmit end (that is, the transmit end at the local end) and the receive end according to an identity NdID of a node to which the receive end belongs and the identity NdID of the node to which the transmit end at the local end belongs in the received PCSL (which is also equivalent to determining the priorities of the local end and the peer end).

506. The receive end at the peer end confirms, according to a link identity number LinkID of the receive end and the link identity number LinkID of the transmit end at the local end in the received PCSL, a sequence number of the Ethernet link to which the corresponding PCSL belongs, selects a LinkID of the end having a higher priority as the home Ethernet link of the PCSL, and ensures, according to an acknowledgement identity Ack of the receive end and the acknowledgement identity Ack of the transmit end at the local end in the received PCSL, that information, determined by the receive end and the transmit end at the local end, about the Ethernet link to which the PCSL belongs is consistent.

Figure 9:
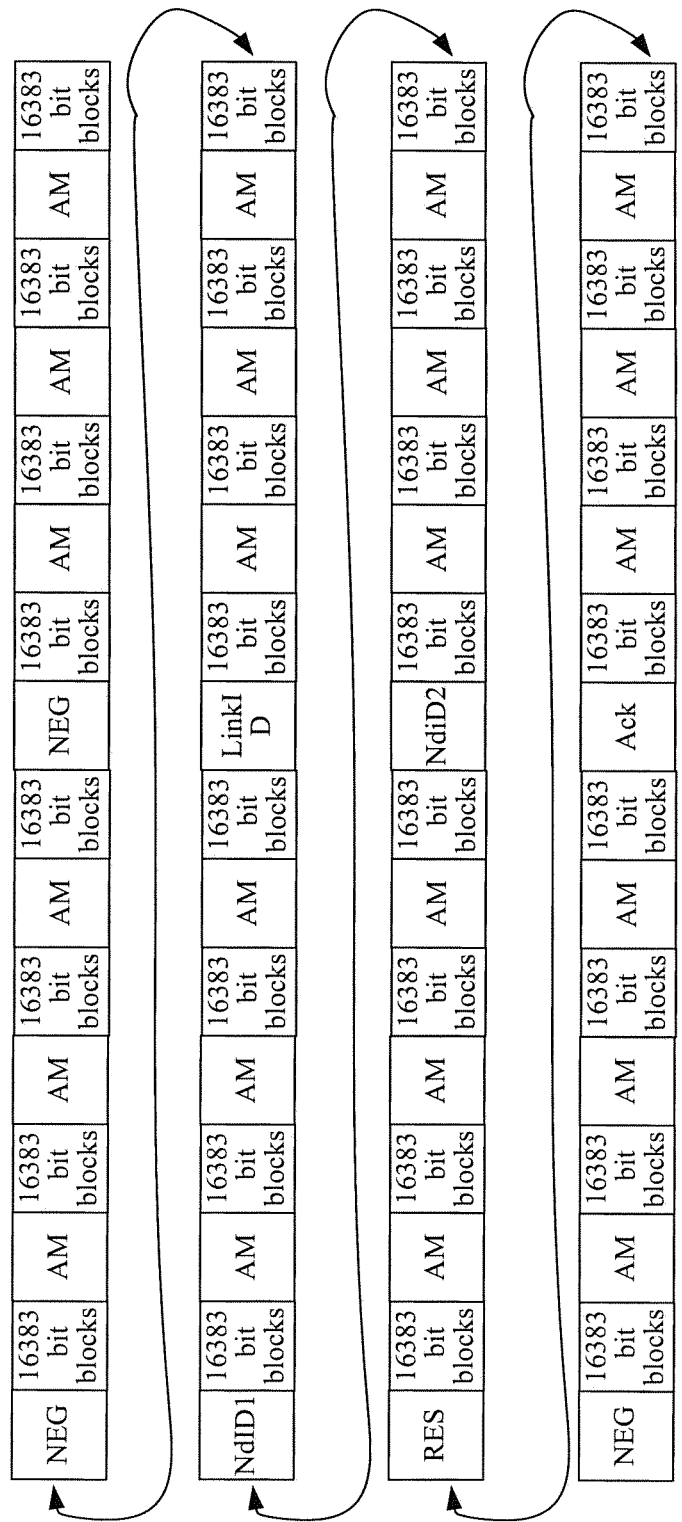
FIG. 9 is a schematic diagram of a data structure of a data transmission method according to another embodiment of the present invention.

The following provides description by using an example. Referring to FIG. 9, the 100GBASE-R is used as an example. An insertion case in a PCSL is shown in the following figure. Main characteristics are: 1. One feature code block is inserted every other three consecutive AMs. These feature code blocks include: a link identity number LinkID, information NEG indicating whether Ethernet auto-negotiation is supported, an identity NdID (which is expressed by NdID1 and NdID2 together in the figure) of a node to which an Ethernet belongs, a port status configuration acknowledgement Ack of a transmit end, and a reserved feature code block RES. Another spacing quantity may also be selected. A selection principle of the quantity is that a quantity of consecutively sent AMs needs to be not less than a quantity required to lock an AM, and a quantity of consecutively sent feature code blocks is less than a quantity required to detect out-of-lock of an AM; 2. A feature code block and an AM may be cyclically inserted. Feature code blocks in a period form a feature code block frame, and two adjacent NEGs are used for framing (accurate framing may be implemented because an NEG code is different from an AM).

(2) Selection of a feature code block: Feature code block processing is similar to LinkID processing in the foregoing embodiment. Because a location is the same as an existing AM location, a feature code block needs neither a scrambling code nor a specially defined value. A structure thereof is similar to a structure of an AM (see FIG. 4). For a value of the LinkID, see FIG. 4. For the feature code block NEG, two coded sequences are newly selected according to an AM design principle, where "0x90, 0x76, 0x47, $BIP_3$, 0x6F, 0x89, 0xB8, $BIP_7$" indicates that FlexEth auto-negotiation is not supported, and "0xF0, 0xC4, 0xE6, BIP3, 0x0F, 0x3B, 0x19, $BIP_7$" indicates that FlexEth auto-negotiation is supported. NdID1 and NdID2 together indicate an ID of a node to which a FlexEth belongs, and a value may be selected from existing AM codes. A node ID value is equal to a PCSL sequence number corresponding to an existing AM code. In this example, values of NdID1 and NdID2 may be 0 to 19 separately, and total 20×20=400 IDs may be indicated. The Ack indicates acknowledgment of a port status configuration, and two coded sequences are newly selected according to the AM design principle, where "0xC5, 0x65, 0x9B, $BIP_3$, 0x3A, 0x9A, 0x64, $BIP_7$" indicates acknowledged, and "0xA2, 0x79, 0x3D, $BIP_3$, 0x5D, 0x86, 0xC2, $BIP_7$" indicates denied. When the feature code block reservation RES is not used, an AM may be inserted. Certainly, in the present invention, a structure of the RES may not be designed.

Figure 10:
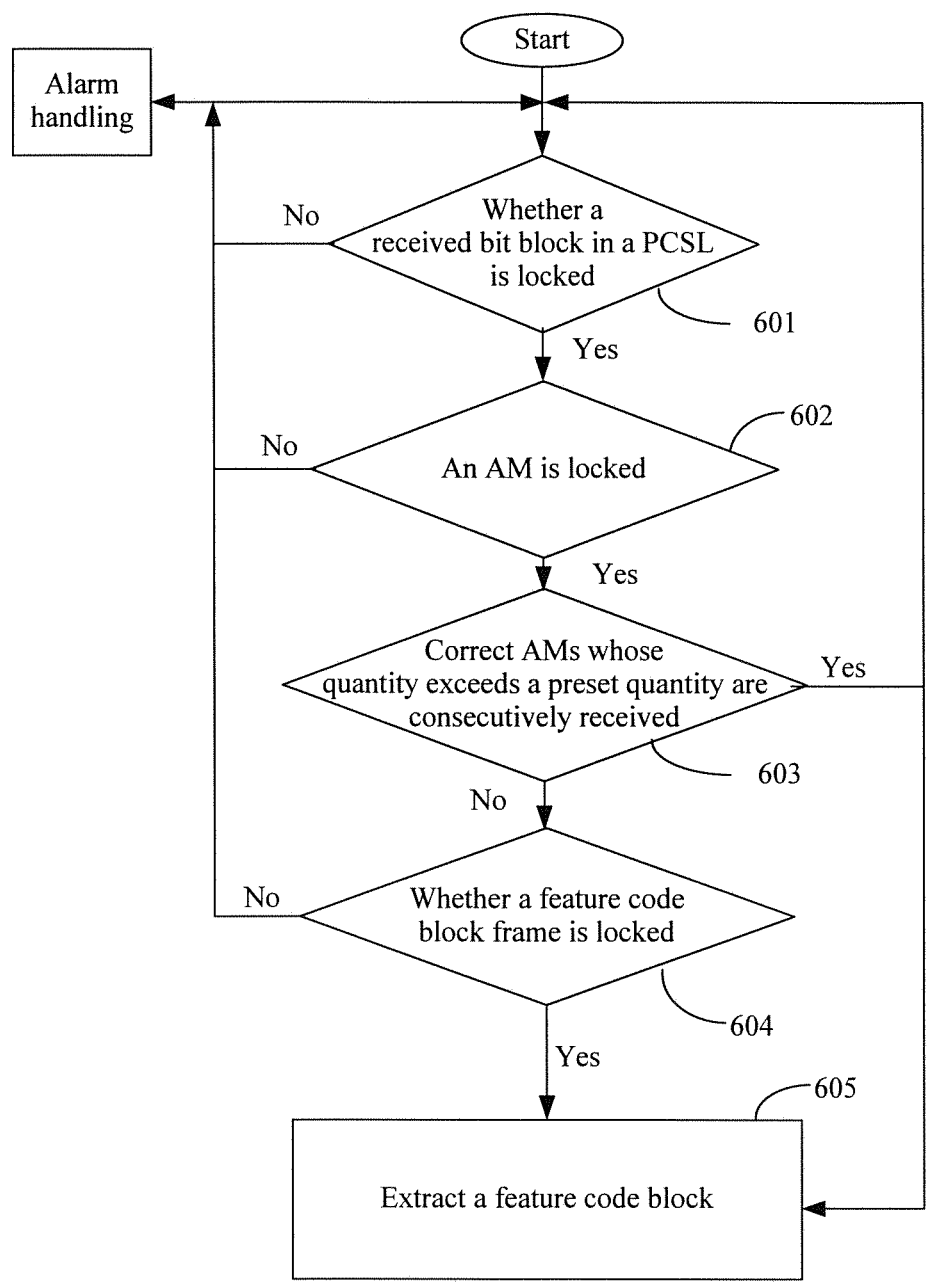
FIG. 10 is a schematic flowchart of a feature code block receiving process according to an embodiment of the present invention.

(3) Referring to FIG. 10, a process of receiving a feature code block includes the following steps:

601. Detect whether a received bit block in a PCSL is locked.

602. If the received bit block is locked, detect whether an AM at an AM location is locked; and if no, turn to step 601.

603. If the AM at the AM location is locked, detect whether correct AMs whose quantity exceeds a preset quantity can be consecutively received; and if yes, turn to step 601.

A correct AM is an AM that meets a coding pattern stipulated in a standard, where codes corresponding to PCSL sequence numbers in consecutively received AMs are the same. An AM that does meet any one of the foregoing items is referred to as an incorrect AM. Referring to a data structure shown in FIG. 9, the preset quantity has been set to 19.

604. If the correct AMs whose quantity exceeds the preset quantity cannot be consecutively received, determine whether a feature code block frame is locked; and if the feature code block frame is not locked, turn to step 601.

For a specific detection manner, refer to the data structure shown in FIG. 9. A header of a feature code block frame is identified as that two same NEGs meeting an NEG coding rule can be detected every other three consecutive correct AMs. If the frame header is successfully detected for one time, a lock state of the feature code block frame is entered; otherwise, an out-of-lock state is entered.

605. If the feature code block frame is locked, extract a feature code block.

FIG. 10 is a reception process designed based on the method for inserting a feature code block in FIG. 9. Therefore, in "consecutively detecting more than 19 correct AMs" in the foregoing figure, the quantity 19 is also determined according to the method for inserting a feature code block in FIG. 9. Reasons for selecting 19 are as follows: First, in a feature code block frame, the second NEG and an Ack are spaced by 19 AMs; Second, an NEG and an Ack are codewords that are formed by using different coding manners and that are different from an AM code, that is, are beyond an AM code range. However, another feature code block uses an AM code, and it cannot be distinguished whether the other feature code block indicates a feature code block or an AM. As a result, it indicates that the PCSL contains no feature code block as long as more than 19 consecutive correct AMs occur. Therefore, in the foregoing figure, "consecutively detecting more than 19 correct AMs" is actually determining whether a PCSL contains a feature code block. A determining criterion is a quantity of AMs inserted between two feature code blocks that do not use an AM code.

Figure 11:
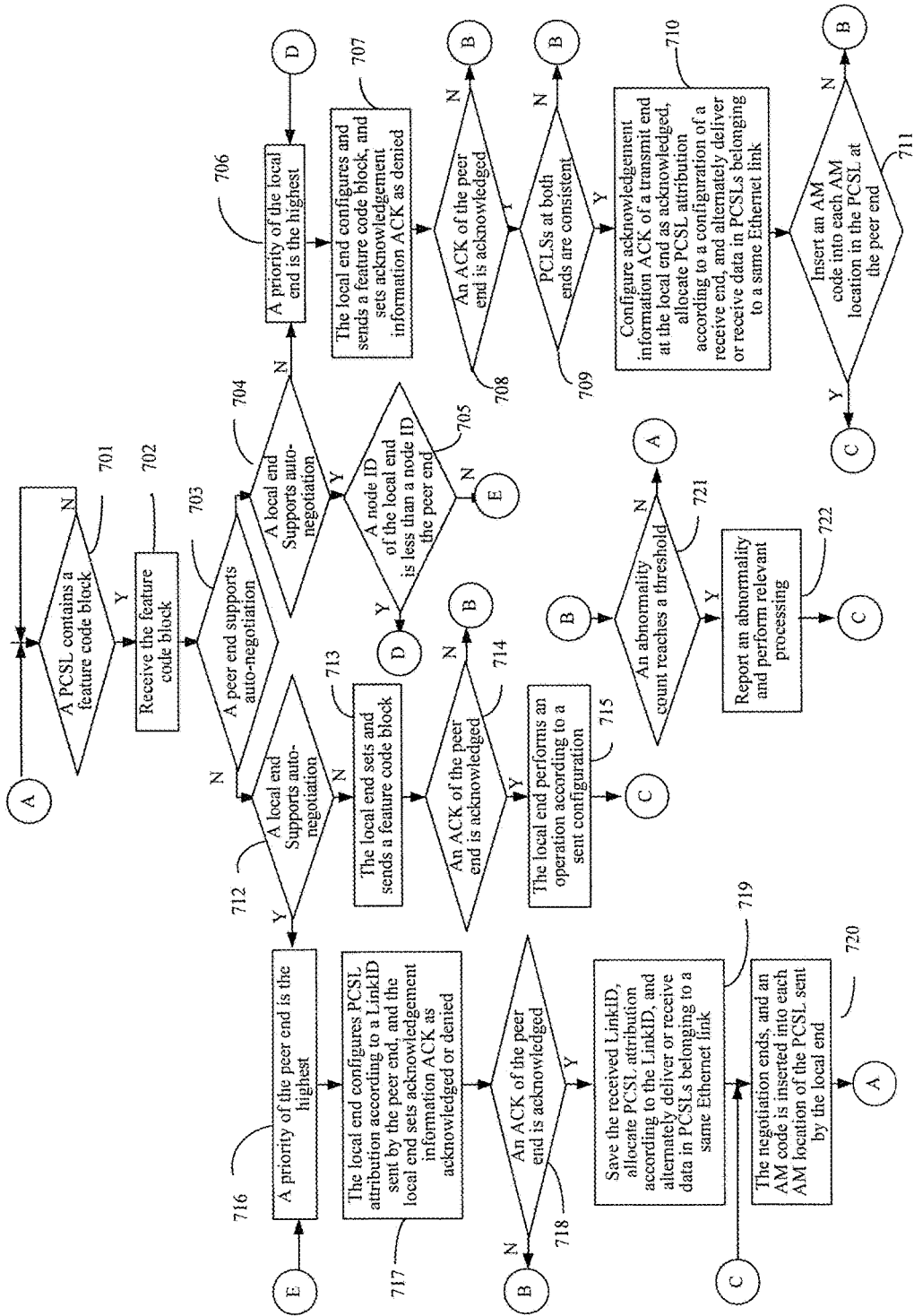
FIG. 11 is a schematic diagram of a PCSL attribution negotiation process according to an embodiment of the present invention.

(4) On a basis of receiving a feature code block, PCSL attribution negotiation may be implemented. Refer to the foregoing steps 505 to 507. A process performed by a receive end at a local end when the local end initiates auto-negotiation is used as an example for description. Refer to FIG. 11 (only keywords in each step are provided in FIG. 11. For detailed steps, refer to specific description in the embodiment. In FIG. 11, Y indicates Yes, and N indicates No). For a specific implementation manner, refer to the following process (in another case, processing may be obtained by means of simple reasoning or may be similar, and is not described again) A, B, C, D, and E indicate connecting points in a flowchart of the negotiation process.

Step 701 is performed from A.

701. A receive end at a local end determines whether a received PCSL contains a feature code block; and if no, returns to A and re-performs step 701; or if yes, performs step 702.

702. The receive end at the local end receives the feature code block (this process has been described in detail in steps 601 to 605, and is not described herein again). In step 702, the feature code block can be extracted.

703. Determine whether a transmit end at a peer end supports FlexEth auto-negotiation. In general, a transmit end and a receive end of a port should be consistent in terms of whether FlexEth auto-negotiation is supported. That is, if a transmit end of a port supports Flex auto-negotiation, it means that a receive end of the port also supports FlexEth auto-negotiation; if a transmit end of a port does not support Flex auto-negotiation, it means that a receive end of the port does not support FlexEth auto-negotiation, either. In the entire specification, a meaning about whether a receive end or a transmit end supports FlexEth auto-negotiation is also similar.

704. If the transmit end at the peer end supports FlexEth auto-negotiation, determine whether the receive end at the local end supports FlexEth auto-negotiation.

705. If the receive end at the local end supports FlexEth auto-negotiation, determine whether a node ID value of the receive end at the local end is less than a node ID of the transmit end at the peer end. If the node ID value of the receive end at the local end is less than the node ID of the transmit end at the peer end, a subsequent process after step 706 is continuously performed; otherwise, step 716 is performed. According to the data structure provided in FIG. 9, the node ID of the transmit end at the peer end or a node ID of the receive end at the local end is constituted by NdID1 and NdID2 together, and a value indicated by NdID1 and NdID2 includes 400 IDs. A transmit end and a receive end of a same port are located on a same node, and therefore have a same node ID. If the transmit end at the peer end supports FlexEth auto-negotiation, and the receive end at the local end does not support FlexEth auto-negotiation, step 706 is performed.

706. Determine that a priority of the receive end at the local end is higher.

707. The local end configures a feature code according to a situation of the receive end, and a transmit end at the local end sends the feature code, where acknowledgement information ACK is set as denied.

708. Determine whether an ACK of the transmit end at the peer end is acknowledged; and if no, perform step 721.

709. If the ACK of the transmit end at the peer end is acknowledged, determine whether an attribution configuration of a PCLS of the transmit end at the peer end is consistent with that of the receive end at the local end; and if no, perform step 721.

710. If the attribution configuration of the PCLS of the transmit end at the peer end is consistent with that of the receive end at the local end, configure acknowledgement information ACK of the receive end at the local end as acknowledged, allocate PCSL attribution according to a configuration of the receive end at the local end, and alternately deliver or receive data in PCSLs belonging to a same Ethernet link.

711. Determine whether an AM code is inserted into each AM location in the PCSL of the transmit end at the peer end; and if yes, perform step 720; or if no, perform step 721.

712. If the transmit end at the peer end does not support FlexEth auto-negotiation, determine whether the receive end at the local end supports FlexEth auto-negotiation.

713. If the receive end at the local end does not support FlexEth auto-negotiation, the local end sets a feature code block, and a transmit end at the local end sends the feature code block to a receive end at the peer end. If a PCSL attribution configuration at the local end is consistent with that at the peer end, acknowledgement information ACK of the transmit end at the local end is set as acknowledged or denied. If the PCSL attribution configuration at the local end is inconsistent with that at the peer end, the acknowledgement information ACK of the transmit end at the local end is set as denied.

714. Determine whether acknowledgment information ACK of the transmit end at the peer end is acknowledged; and if no, perform step 721.

715. If the acknowledgement information ACK of the transmit end at the peer end is acknowledged, the local end configures a feature code according to a situation of the receive end, and the transmit end at the local end sends the feature code; and step 720 continues to be performed.

If the local end does not support FlexEth auto-negotiation, and the peer end supports FlexEth auto-negotiation, step 716 is performed.

716. Determine that a priority of the transmit end at the peer end is higher.

717. The receive end at the local end configures PCSL attribution according to a LinkID sent by the transmit end at the peer end, and a transmit end at the local end sets acknowledgement information ACK as acknowledged or denied.

718. Determine whether an ACK of the transmit end at the peer end is acknowledged; and if no, perform step 721.

719. If the ACK of the transmit end at the peer end is acknowledged, the local end saves the received LinkID, allocates the PCSL attribution according to the LinkID, alternately delivers or receives data in PCSLs belonging to a same Ethernet link, and continues to perform step 720.

720. The negotiation ends, and an AM code is inserted into each AM location of the PCSL sent by the receive end at the local end. Then step 701 is cyclically performed.

721. Determine whether an abnormality count reaches a preset threshold; and if no, perform step 701.

722. If the abnormality count reaches the preset threshold, report an abnormality, perform relevant processing, and continue to perform step 720.

In the foregoing PCSL attribution negotiation process, whether a PCSL contains a feature code block is used to identify whether to enable negotiation; a port that does not support negotiation has a higher priority; a port having a small NdID has a higher priority, where for a port priority herein, it may also be preset that a port having a large NdID has a higher priority, and in this case, the foregoing steps need to be adaptively adjusted, and are not described again; and an Ack is used to negotiate a status of a port.

According to the data transmission method provided in this embodiment of the present invention, sub-Ethernet information used to represent PCLS attribution is inserted between bit blocks of a physical coding sublayer PCS, so that a receive end can acquire PCLS attribution information, so as to resolve an issue of how to identify and extract a signal of a corresponding sub-Ethernet link from signals of an entire flexible Ethernet.

Figure 12:
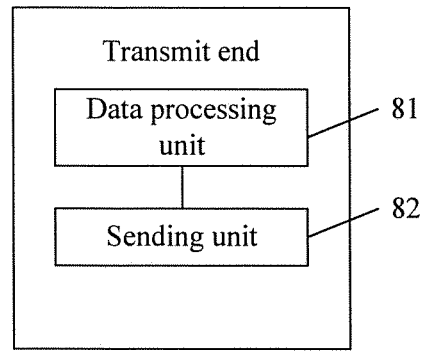
FIG. 12 is a schematic structural diagram of a transmit end according to an embodiment of the present invention.

An embodiment of the present invention provides a transmit end. Referring to FIG. 12, the transmit end is configured to implement the foregoing data transmission method, including:

a data processing unit 81, configured to insert a feature code block into a physical coding sublayer PCS to form a physical coding sublayer lane PCSL, where the feature code block is used to represent an Ethernet link to which the PCSL belongs; and a sending unit 82, configured to send the PCSL formed by the data processing unit 81.

The foregoing transmit end inserts, between bit blocks of a physical coding sublayer PCS, sub-Ethernet information used to represent PCLS attribution, so that a receive end can acquire PCLS attribution information, so as to resolve an issue of how to identify and extract a signal of a corresponding sub-Ethernet link from signals of an entire flexible Ethernet.

Optionally, there is one feature code block or one alignment marker AM at each of locations of which each spacing is a preset quantity of bit blocks in the PCSL, where the AM is used to identify a sequence number of the PCSL.

Further, optionally, a quantity of consecutive locations, at which there are AMs, of the locations of which each spacing is the preset quantity of bit blocks in the PCSL is not less than a first preset quantity, where the first preset quantity is a quantity required to lock an AM; and a quantity of consecutive locations, at which there are feature code blocks, of the locations of which each spacing is the preset quantity of bit blocks in the PCSL is less than a second preset quantity, where the second preset quantity is a quantity required to detect out-of-lock of an AM.

Optionally, the feature code block includes a link identity LinkID, where the LinkID is used to identify a sequence number of the Ethernet link to which the PCSL belongs, and the LinkID uses a same coding method as an alignment marker AM.

Optionally, the feature code block further includes the following information of the transmit end: an identity NEG indicating whether Ethernet auto-negotiation is supported, an identity NdID of an affiliated node, and an acknowledgement identity Ack, where the NEG, the NdID, the Ack, and the LinkID are used for negotiation, so as to determine the Ethernet link to which the PCSL belongs.

The transmit end provided in this embodiment of the present invention inserts, between bit blocks of a physical coding sublayer PCS, sub-Ethernet information used to represent PCLS attribution, so that a receive end can acquire PCLS attribution information, so as to resolve an issue of how to identify and extract a signal of a corresponding sub-Ethernet link from signals of an entire flexible Ethernet, and processes of implementing PCLS attribution acknowledgement and negotiation can be compatible.

Figure 13:
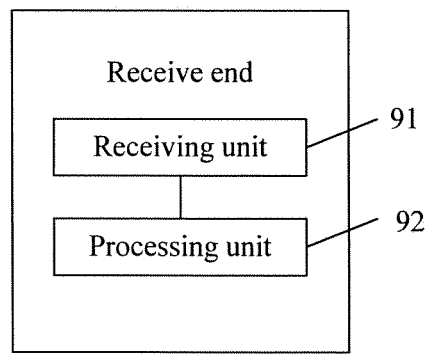
FIG. 13 is a schematic structural diagram of a receive end according to an embodiment of the present invention.

An embodiment of the present invention provides a receive end. Referring to FIG. 13, the receive end is configured to implement the foregoing data transmission method, including:

a receiving unit 91, configured to receive a physical coding sublayer lane PCSL; and a processing unit 92, configured to determine, according to a feature code block inserted into the PCSL received by the receiving unit 91, an Ethernet link to which the PCSL belongs.

According to the foregoing receive end, sub-Ethernet information used to represent PCLS attribution is inserted between bit blocks of a physical coding sublayer PCS, so that the receive end can acquire PCLS attribution information, so as to resolve an issue of how to identify and extract a signal of a corresponding sub-Ethernet link from signals of an entire flexible Ethernet.

Optionally, there is one feature code block or one alignment marker AM at each of locations of which each spacing is a preset quantity of bit blocks in the PCSL, where the AM is used to identify a sequence number of the PCSL.

Optionally, the feature code block includes a link identity LinkID, and the processing unit 92 is specifically configured to:

determine, according to the link identity LinkID inserted into the PCSL received by the receiving unit 91, the Ethernet link to which the PCSL belongs.

Optionally, the feature code block further includes the following information of a transmit end: an identity NEG indicating whether Ethernet auto-negotiation is supported, an identity NdID of an affiliated node, and an acknowledgement identity Ack.

Figure 14:
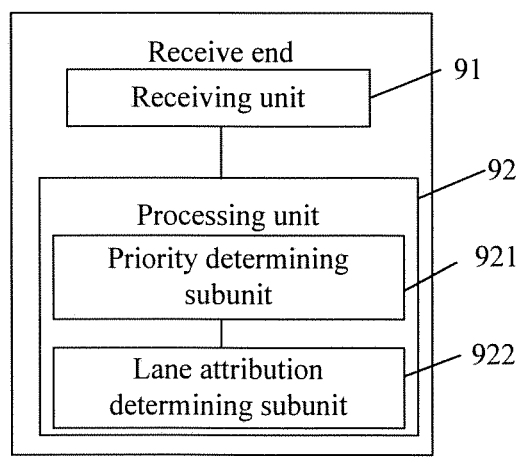
FIG. 14 is a schematic structural diagram of a receive end according to another embodiment of the present invention.

Referring to FIG. 14, the processing unit 92 includes:

a priority determining subunit 921, configured to determine priorities of the transmit end and the receive end according to an identity NEG indicating whether the receive end supports Ethernet auto-negotiation and the identity NEG, of the transmit end, indicating whether Ethernet auto-negotiation is supported in the received PCSL, where a priority of an end that does not support auto-negotiation is higher; and determine the priorities of the transmit end and the receive end according to an identity NdID of a node to which the receive end belongs and the identity NdID of the node to which the transmit end belongs in the received PCSL; and a lane attribution determining subunit 922, configured to confirm, according to a link identity number LinkID of the receive end and the link identity number LinkID of the transmit end in the received PCSL, a sequence number of the Ethernet link to which the corresponding PCSL belongs, select a LinkID of the end having a higher priority as the home Ethernet link of the PCSL, and ensure, according to an acknowledgement identity Ack of the receive end and the acknowledgement identity Ack of the transmit end in the received PCSL, that information, determined by the receive end and the transmit end, about the Ethernet link to which the PCSL belongs is consistent.

According to the receive end provided in this embodiment of the present invention, sub-Ethernet information used to represent PCLS attribution is inserted between bit blocks of a physical coding sublayer PCS, so that the receive end can acquire PCLS attribution information, so as to resolve an issue of how to identify and extract a signal of a corresponding sub-Ethernet link from signals of an entire flexible Ethernet, and processes of implementing PCLS attribution acknowledgement and negotiation can be compatible.

Figure 15:
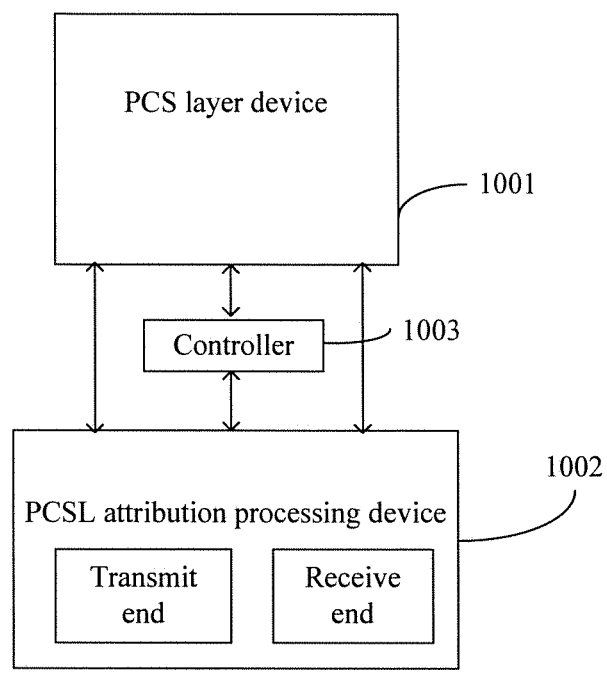
FIG. 15 is a schematic structural diagram of a PCSL attribution processing device according to an embodiment of the present invention.

Referring to FIG. 15, an embodiment of the present invention provides a PCSL attribution processing device 1002, including any transmit end provided in the foregoing embodiment corresponding to FIG. 12 and/or any receive end provided in the foregoing apparatus embodiments corresponding to FIG. 13 and FIG. 14.

Based on the foregoing PCSL attribution processing device 1002 shown in FIG. 15, an embodiment of the present invention provides a data transmission system. Referring to FIG. 15, the data transmission system includes a PCS layer device 1001 and a PCSL attribution processing device 1002, where the PCSL attribution processing device is the PCSL attribution processing device provided in FIG. 15.

Figure 16:
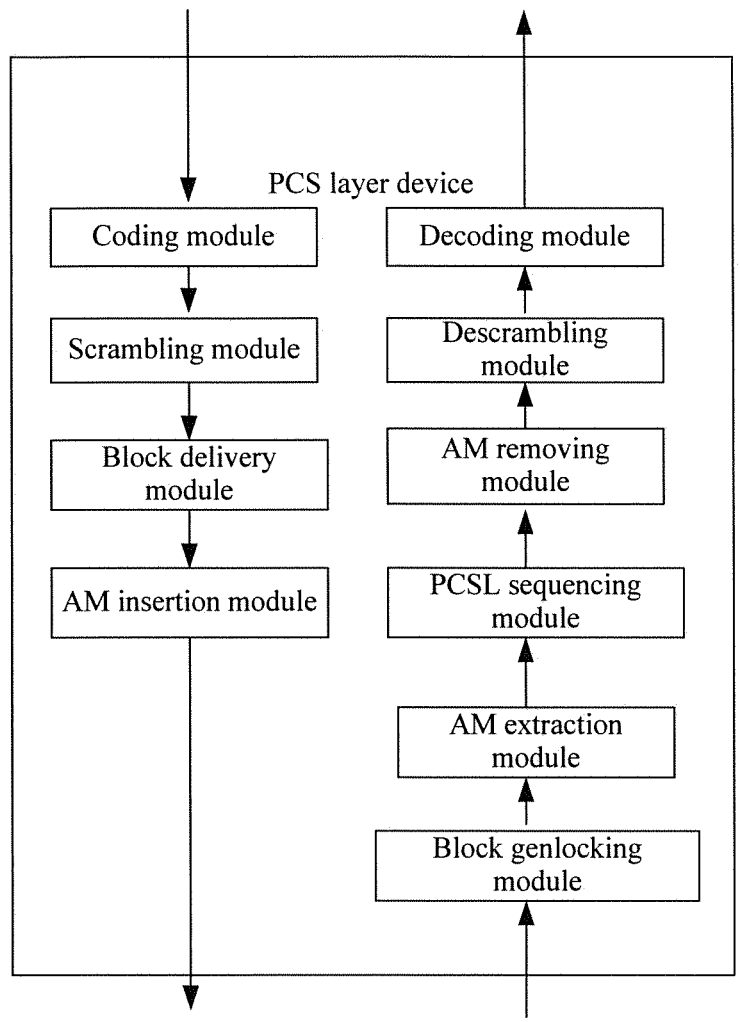
FIG. 16 is a schematic structural diagram of a PCS layer device in the prior art according to an embodiment of the present invention.

Referring to FIG. 16, an embodiment of the present invention provides a PCS layer device provided in the prior art. The PCS layer device includes a function for implementing a transmit end. Sent data is coded by using a coding module, and then is scrambled by using a scrambling module. A PCSL is generated by using a block delivery module, and is sent to the transmit end after an AM insertion module inserts an AM between bit blocks.

The PCS layer device includes a function for implementing a receive end. For a received PCSL, data reception synchronization is implemented with a transmit end by using a block synchronization module, and then an AM in the PCSL is extracted by using an AM extraction module. Bit blocks in the received PCSL are re-sequenced according to the AM. Then an AM in data is removed by using an AM removing module. Finally, descrambling processing is performed by using a descrambling module, and original data is restored by means of decoding processing performed by a decoding module.

With reference to the foregoing data transmission method and a function of an existing PCS layer device, the PCSL attribution processing device 1002 sends, by using a controller 1003, acquired PCSL attribution information to a block delivery module of the PCS layer device, so that sending is performed according to a specified PCSL in a data sending processing; sends, by using the controller 1003, the acquired PCSL attribution information to a scrambling module and a decoding module of the PCS layer device, so as to identify the PCSL attribution information in a data reception process; and controls, by using the controller, the block delivery module, the scrambling module, and the decoding module to perform separate operations on bit blocks belonging to a same Ethernet link. Other modules and functions are similar to those in FIG. 16, and are not described again. In this way, a manner of making, by using the PCSL attribution processing device 1002, processing of PCSL attribution identification, acknowledgement or negotiation be independent of existing PCS layer processing is implemented, which ensures that PCS layer processing and an existing manner are not changed basically, that is, existing hardware is basically or completely compatible. PCSL attribution processing may be completed in a separate chip, and an existing MAC/PCS (MAC, medium access control, Medium Access Control) chip can continue to be used.

Figure 17:
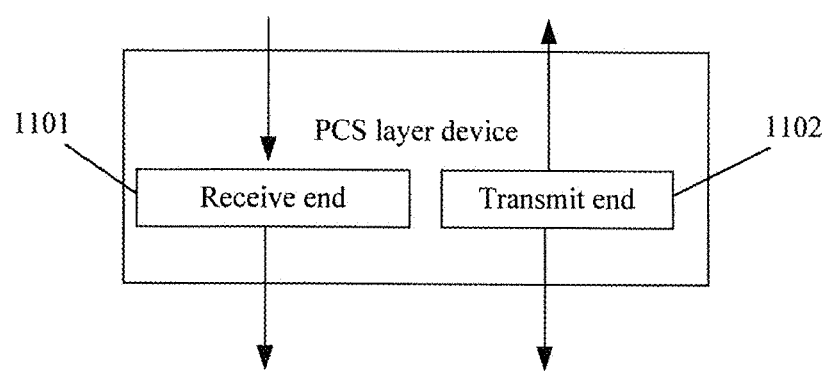
FIG. 17 is a schematic structural diagram of a PCS layer device according to an embodiment of the present invention.

Referring to FIG. 17, an embodiment of the present invention provides a PCSL layer device. The PCS layer device is used as a PCSL attribution processing device, and includes any transmit end 1101 provided in the foregoing apparatus embodiment corresponding to FIG. 12 and/or any receive end 1102 provided in the foregoing apparatus embodiments corresponding to FIG. 13 and FIG. 14.

Figure 18:
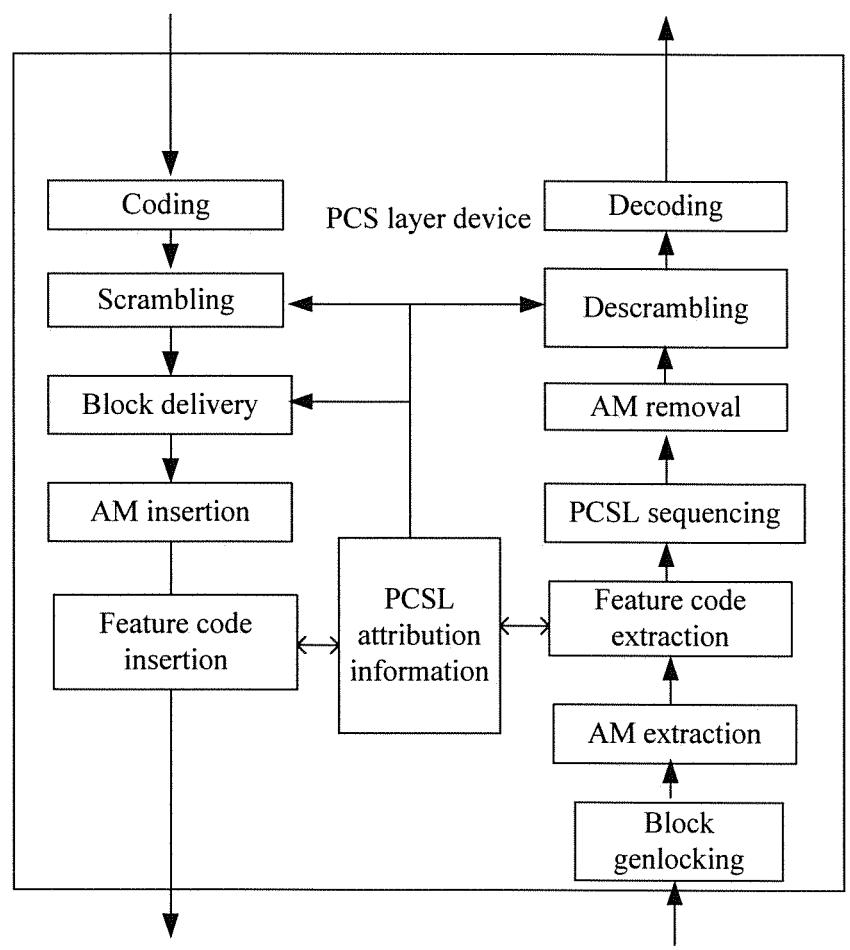
FIG. 18 is a schematic functional diagram of a PCS layer device according to an embodiment of the present invention.

Refer to FIG. 18, which provides a functional diagram of the PCS layer device shown in FIG. 17. Functions of block delivery and AM insertion are implemented according to the method provided in the embodiments of the present invention. In addition, scrambling and descrambling also need to be separately performed, according to acknowledged PCSL attribution information, in blocks belonging to one sub-Ethernet link. Remaining functions of coding, block gen-locking, AM extraction, PCSL sequencing, AM removal, and decoding belong to the prior art. Reference may be made to descriptions of corresponding modules in FIG. 16, and details are not described again. In this process, the data transmission method provided in the embodiments of the present invention can be implemented by simply improving the PCS layer device provided in the prior art.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
    inserting a plurality of feature code blocks and a plurality of alignment markers (AMs) into a physical coding sublayer (PCS) to form a physical coding sublayer lane (PCSL);
    wherein each AM identifies a sequence number of the PCSL;
    wherein each feature code block is used to determine an Ethernet link to which the PCSL belongs;
    wherein the PCSL includes a plurality of locations spaced a preset quantity of bit blocks from one another, and at each of the plurality of locations there is either one feature code block or one AM;
    wherein the PCSL includes a first quantity of consecutive locations of the plurality of locations, at which there are AMs, the first quantity being not less than a first preset quantity, wherein the first preset quantity is a quantity required to lock an AM; and
    wherein a second quantity of consecutive locations of the plurality of locations, at which there are feature code blocks, is less than a second preset quantity, wherein the second preset quantity is a quantity required to detect out-of-lock of an AM; and
    sending the PCSL.

2. The method according to claim 1, wherein at least one of the feature code blocks comprises a link identity (LinkID) used to identify a sequence number of the Ethernet link to which the PCSL belongs, and the LinkID uses a same coding method as the AMs.

3. A data transmission method, comprising:
    inserting a feature code block into a physical coding sublayer (PCS) to form a physical coding sublayer lane (PCSL), wherein the PCSL includes an alignment marker (AM) for identifying a sequence number of the PCSL and the feature code block is used to represent an Ethernet link to which the PCSL belongs;
    sending the PCSL;
    wherein the feature code block comprises a link identity (LinkID) used to identify a sequence number of the Ethernet link to which the PCSL belongs, and the LinkID uses a same coding method as the AM;
    wherein the feature code block is used for Ethernet auto-negotiation between two ports to which the Ethernet link belongs so as to determine the Ethernet link to which the PCSL belongs; and
    wherein the feature code block further comprises the following information of a transmit end: an identity (NEG) indicating whether Ethernet auto-negotiation is supported in the PCSL, an identity (NdID) of an affiliated node that belongs to the Ethernet link to which the PCSL belongs, and an acknowledgement identity (Ack), wherein the NEG, the NdID, the Ack, and the LinkID are used for Ethernet auto-negotiation with at least one other PCSL, so as to determine that the PCSL and the at least one other PCSL belong to the Ethernet link to which the PCSL belongs.

4. A data transmission method, comprising:
    receiving a physical coding sublayer lane (PCSL), wherein the PCSL includes a plurality of alignment markers (AMs) to identify a sequence number of the PCSL and a plurality of feature code blocks;
    wherein the PCSL includes a plurality of locations spaced a preset quantity of bit blocks from one another, and at each of the plurality of locations there is either one feature code block or one AM;
    wherein the PCSL includes a first quantity of consecutive locations of the plurality of locations, at which there are AMs, the first quantity being not less than a first preset quantity, wherein the first preset quantity is a quantity required to lock an AM; and
    wherein a second quantity of consecutive locations of the plurality of locations, at which there are feature code blocks, is less than a second preset quantity, wherein the second preset quantity is a quantity required to detect out-of-lock of an AM; and determining, according to at least one of the feature code blocks inserted into the PCSL, an Ethernet link to which the PCSL belongs.

5. The method according to claim 4, wherein:
at least one of the feature code blocks comprises a link identity (LinkID); and
determining, according to at least one of the feature code blocks inserted into the PCSL, an Ethernet link to which the PCSL belongs comprises:
determining, according to the LinkID inserted into the PCSL, the Ethernet link to which the PCSL belongs.

6. A data transmission method, comprising:
receiving a physical coding sublayer lane (PCSL);
determining, according to a feature code block inserted into the PCSL, an Ethernet link to which the PCSL belongs, wherein the feature code block comprises a link identity (LinkID);
wherein determining, according to a feature code block inserted into the PCSL, an Ethernet link to which the PCSL belongs comprises:
determining, according to the LinkID inserted into the PCSL, the Ethernet link to which the PCSL belongs;
wherein the feature code block further comprises the following information of a transmit end:
an identity (NEG) indicating whether Ethernet auto-negotiation is supported in the PCSL, an identity (NdID) of an affiliated node that belongs to the Ethernet link to which the PCSL belongs, and an acknowledgement identity (Ack); and
wherein determining, according to a feature code block inserted into the PCSL, an Ethernet link to which the PCSL belongs comprises:
determining priorities of the transmit end and a receive end according to an identity NEG indicating whether the receive end supports Ethernet auto-negotiation and the identity NEG, of the transmit end, indicating whether Ethernet auto-negotiation is supported in the received PCSL, wherein a priority of an end that does not support auto-negotiation is higher,
determining the priorities of the transmit end and the receive end according to an identity NdID of a node to which the receive end belongs and the identity NdID of the node to which the transmit end belongs in the received PCSL, and
confirming, according to a link identity number LinkID of the receive end and the link identity number LinkID of the transmit end in the received PCSL, a sequence number of the Ethernet link to which the corresponding PCSL belongs, selecting a LinkID of the end having a higher priority as a home Ethernet link of the PCSL, and ensuring, according to an acknowledgement identity Ack of the receive end and the acknowledgement identity Ack of the transmit end in the received PCSL, that information, determined by the receive end and the transmit end, about the Ethernet link to which the PCSL belongs is consistent.

7. A transmit end, comprising:
a processor, configured to insert a plurality of feature code blocks and a plurality of alignment markers (AMs) into a physical coding sublayer (PCS) to form a physical coding sublayer lane (PCSL);
wherein each AM identifies a sequence number of the PCSL;
wherein each feature code block is used to represent an Ethernet link to which the PCSL belongs;
wherein the PCSL includes a plurality of locations spaced a preset quantity of bit blocks from one another, and at each of the plurality of locations there is either one feature code block or one AM;
wherein the PCSL includes a first quantity of consecutive locations of the plurality of locations, at which there are AMs, the first quantity being not less than a first preset quantity, wherein the first preset quantity is a quantity required to lock an AM; and
wherein a second quantity of consecutive locations of the plurality of locations, at which there are feature code blocks, is less than a second preset quantity, wherein the second preset quantity is a quantity required to detect out-of-lock of an AM; and
one or more network interfaces, configured to send the PCSL formed by the processor.

8. The transmit end according to claim 7, wherein at least one of the feature code blocks comprises a link identity (LinkID) used to identify a sequence number of the Ethernet link to which the PCSL belongs, and the LinkID uses a same coding method as the AMs.

9. A transmit end, comprising:
a processor, configured to insert a feature code block into a physical coding sublayer (PCS) to form a physical coding sublayer lane (PCSL), wherein the feature code block is used to represent an Ethernet link to which the PCSL belongs;
one or more network interfaces, configured to send the PCSL formed by the processor;
wherein the feature code block comprises a link identity (LinkID) used to identify a sequence number of the Ethernet link to which the PCSL belongs, and the LinkID uses a same coding method as an alignment marker (AM); and
wherein the feature code block further comprises the following information of the transmit end: an identity (NEG) indicating whether Ethernet auto-negotiation is supported in the PCSL, an identity (NdID) of an affiliated node that belongs to the Ethernet link to which the PCSL belongs, and an acknowledgement identity (Ack), wherein the NEG, the NdID, the Ack, and the LinkID are used for Ethernet auto-negotiation with at least one other PCSL, so as to determine that the PCSL and the at least one other PCSL belong to the Ethernet link to which the PCSL belongs.

10. A receive end, comprising:
one or more network interfaces, configured to receive a physical coding sublayer lane (PCSL), wherein the PCSL includes a plurality of alignment markers (AMs) to identify a sequence number of the PCSL and a plurality of feature code blocks;
wherein the PCSL includes a plurality of locations spaced a preset quantity of bit blocks from one another, and at each of the plurality of locations there is one feature code block or one AM;
wherein the PCSL includes a first quantity of consecutive locations of the plurality of locations, at which there are AMs, the first quantity being not less than a first preset quantity, wherein the first preset quantity is a quantity required to lock an AM; and
wherein a second quantity of consecutive locations of the plurality of locations, at which there are feature code blocks, is less than a second preset quantity, wherein the second preset quantity is a quantity required to detect out-of-lock of an AM; and
a processor, configured to determine, according to at least one of the feature code blocks inserted into the PCSL received by the one or more network interfaces, an Ethernet link to which the PCSL belongs.

11. The receive end according to claim 10, wherein:

at least one of the feature code blocks comprises a link identity (LinkID); and the processor is configured to:

determine, according to the LinkID inserted into the PCSL received by the one or more network interfaces, the Ethernet link to which the PCSL belongs.

12. A receive end, comprising:

one or more network interfaces, configured to receive a physical coding sublayer lane (PCSL); and a processor, configured to determine, according to a feature code block inserted into the PCSL received by the one or more network interfaces, an Ethernet link to which the PCSL belongs, wherein the feature code block comprises a link identity (LinkID);

wherein the processor is configured to determine, according to the LinkID inserted into the PCSL received by the one or more network interfaces, the Ethernet link to which the PCSL belongs; and wherein the feature code block further comprises the following information of a transmit end:

an identity (NEG) indicating whether Ethernet auto-negotiation is supported, an identity (NdID) of an affiliated node that belongs to the Ethernet link to which the PCSL belongs, and an acknowledgement identity (Ack); and the processor is configured to:

determine priorities of the transmit end and the receive end according to an identity NEG indicating whether the receive end supports Ethernet auto-negotiation and the identity NEG, of the transmit end, indicating whether Ethernet auto-negotiation is supported in the received PCSL, wherein a priority of an end that does not support auto-negotiation is higher; and determine the priorities of the transmit end and the receive end according to an identity NdID of a node to which the receive end belongs and the identity NdID of the node to which the transmit end belongs in the received PCSL, and confirm, according to a link identity number LinkID of the receive end and the link identity number LinkID of the transmit end in the received PCSL, a sequence number of the Ethernet link to which the corresponding PCSL belongs, select a LinkID of the end having a higher priority as a home Ethernet link of the PCSL, and ensure, according to an acknowledgement identity Ack of the receive end and the acknowledgement identity Ack of the transmit end in the received PCSL, that information, determined by the receive end and the transmit end, about the Ethernet link to which the PCSL belongs is consistent.

* * * * *